(12) United States Patent
Nakano

(10) Patent No.: US 6,496,454 B1
(45) Date of Patent: Dec. 17, 2002

(54) OPTICAL INFORMATION RECORDING/ REPRODUCING APPARATUS

(75) Inventor: Junichi Nakano, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 219 days.

(21) Appl. No.: 09/630,676

(22) Filed: Aug. 1, 2000

(30) Foreign Application Priority Data

Aug. 5, 1999 (JP) .......................................... 11-222511

(51) Int. Cl.$^7$ ................................................. G11B 7/00
(52) U.S. Cl. .................................. 369/44.37; 369/44.38
(58) Field of Search .......................... 369/44.23, 44.37, 369/44.38, 94, 44.25, 44.29, 44.35

(56) References Cited

U.S. PATENT DOCUMENTS 5,677,903 A * 10/1997 Holtslag et al. ............... 369/94
5,982,733 A * 11/1999 Yanagawa et al. ........ 369/44.37

FOREIGN PATENT DOCUMENTS

| JP | 4-291039 | 10/1992 |
| JP | 7-21565 | 1/1995 |

OTHER PUBLICATIONS

Multilayered Three–Dimensional Optical Memory with Urethane–Urea Copolymer with Multi–Layer Structure, Ishikawa et al., 59th Science Meeting of Applied Physics Society, 16a–V–5.

* cited by examiner

Primary Examiner—Thang V. Tran
(74) Attorney, Agent, or Firm—Frishauf, Holtz, Goodman & Chick, P.C.

(57) ABSTRACT

An optical pickup device comprises a stationary optical system and a movable optical system. The stationary optical system includes a recording/reproducing laser, a collimator for the recording/reproducing laser, a servo laser, a collimator for the servo laser, an actuator for moving the collimator for the servo laser along its optical axis, and a beam coupling/splitting optical element. The movable optical system includes an objective lens and an actuator for moving the objective lens along its optical axis. The point of convergence of recording/reproducing laser light is suitably moved in the layer direction in a recording layer of an optical disk. It is moved in a manner such that the collimator for substantially collimating servo laser light is first moved along its optical axis and the objective lens is then moved along its optical axis to correct defocusing of the servo laser light that is caused by the movement of the collimator for the servo laser light.

10 Claims, 3 Drawing Sheets

OPTICAL INFORMATION RECORDING/REPRODUCING APPARATUS

CROSS-REFERENCE TO RELATED APPLICATIONS

This application is based upon and claims the benefit of priority from the prior Japanese Patent Application No. 11-222511, filed Aug. 5, 1999, the entire contents of which are incorporated herein by reference.

BACKGROUND OF THE INVENTION

The present invention relates to an optical pickup device for recording/reproducing information in/from an optical storage medium, and more specifically, to an optical pickup device for recording/reproducing information in/from an optical storage medium capable of three-dimensional recording by a plurality of beams. Further, the invention relates to an optical information recording/reproducing apparatus using the optical pickup device.

Conventionally known is a technique for recording in or reproducing independent pieces of information from different depths in a recording layer of an optical storage medium.

An optical storage medium or optical disk in/from which information is recorded/reproduced has a relatively thick recording layer and a reflective layer for servo control. Information can be recorded in different depths in the recording layer.

An example of an optical pickup device for three-dimensional recording/reproducing operation is described in Jpn. Pat. Appln. KOKAI Publication No. 7-21565.

The optical pickup device is designed so that a servo beam is converged on a reflective layer of an optical disk, focus control and tracking control are carried out on the basis of light reflected by the reflective layer as a recording/reproducing beam is converged in a recording layer of the optical disk, and the physical properties of the recording layer are locally changed to effect information recording or information is reproduced on the basis of the reflected light.

In the optical pickup device, a collimator for a recording/reproducing light source is moved along its optical axis by an actuator, whereby the point of convergence of the recording/reproducing beam is moved along its optical axis for a distance corresponding to the movement of the collimator with respect to the point of convergence of the servo beam. Thus, the depth of the point of convergence of the recording/reproducing beam in the recording layer is controlled, that is, the recording surface is changed.

In the optical pickup device described above, the collimator for the recording/reproducing light source is moved to change the point of convergence of the recording/reproducing beam. Therefore, the parallelism of the recording/reproducing beam fluctuates as the collimator moves. The change of the parallelism of the recording/reproducing beam causes the incident beam diameter to change with respect to the effective diameter of an objective lens. This results in change of the coupling efficiency or optical transfer efficiency for the objective lens.

Thus, the movement of the collimator for changing the depth of the recording layer or changing the recording surface causes the coupling efficiency for the objective lens to change, so that optical power that reaches the recording layer is changed. This hinders reliable recording/reproducing operation.

In a so-called separated optical system, which includes a stationary optical system portion and a movable optical system portion that is only moved for access operation, in particular, fluctuation of the parallelism of the recording/reproducing beam inevitably causes the coupling efficiency for the objective lens to change in response to the movement of the movable optical system portion also.

Thus, the optical pickup device cannot steadily carry out high-density recording for mass storage, and is not applicable to the separated optical system for high-speed access.

BRIEF SUMMARY OF THE INVENTION

The present invention has been contrived in consideration of these circumstances, and its object is to provide an optical pickup device capable of carrying out reliable recording/reproducing operation without any fluctuation of the parallelism of a recording/reproducing beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

First Embodiment

Figure 1:
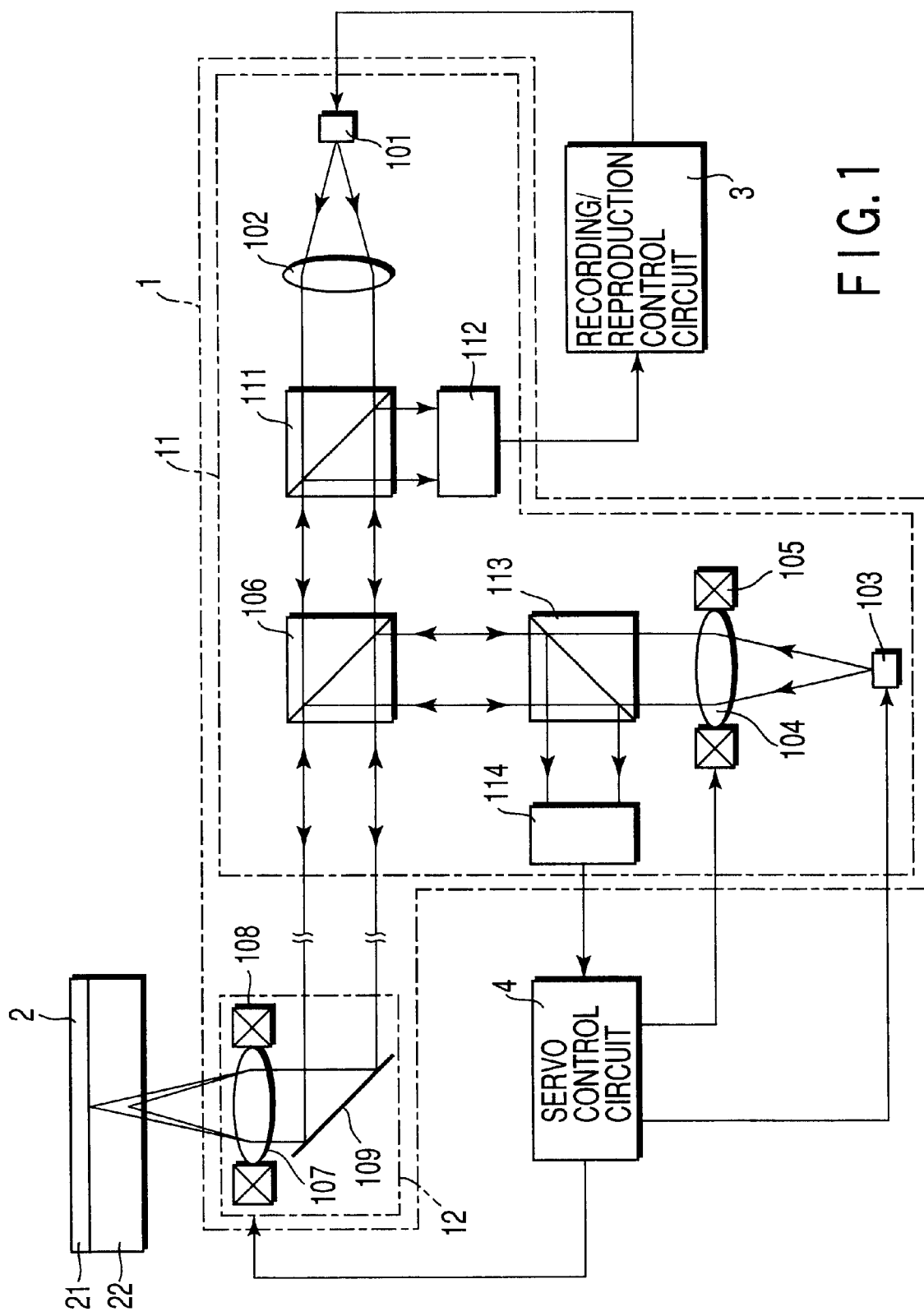
FIG. 1 shows an optical information recording/reproducing apparatus according to a first embodiment of the present invention.

An optical information recording/reproducing apparatus according to a first embodiment of the invention is illustrated in FIG. 1.

Referring to FIG. 1, an optical pickup device 1 of the optical information recording/reproducing apparatus comprises a so-called separated optical system, which includes a stationary optical system 11 and a movable optical system 12.

The stationary optical system 11 comprises a recording/reproducing laser 101 for emitting a beam of recording/ reproducing laser light, collimator 102 for collimating the beam of recording/reproducing laser light, servo laser 103 for emitting a beam of servo laser light, collimator 104 for collimating the beam of servo laser light beam, and actuator 105 for moving the collimator 104 along an optical axis.

The stationary optical system 11 further comprises a beam coupling/splitting optical element 106 for coupling and splitting the beams of the recording/reproducing laser light and the servo laser light. The optical element 106 serves to direct both the beams of recording/reproducing laser light and the servo laser light, coming from different directions, toward the movable optical system 12 and to direct reflected beams, which are reflected from an optical disk 2 and then transmitted through the movable optical system 12, in their respective directions.

Furthermore, the stationary optical system 11 comprises a prism 111, located between the collimator 102 and the beam coupling/splitting optical element 106, for selectively deflecting a beam of reflected recording/reproducing light or regenerative light returning from the optical disk 2 via the movable optical system 12, regenerative signal detecting optical system 112 for detecting a regenerative signal on the basis of the regenerative light deflected by the prism 111, prism 113, located between the collimator 104 and the beam coupling/splitting optical element 106, for selectively deflecting a beam of reflected servo laser light or servo light returning from the optical disk 2 via the movable optical system 12, and servo signal detecting optical system 114 for detecting a servo signal on the basis of the servo light deflected by the prism 113.

The movable optical system 12 comprises an objective lens 107 for converging the beams of the recording/reproducing laser light and the servo laser light from the stationary optical system 11, actuator 108 for moving the objective lens 107 along the optical axis, and mirror 109 for directing the beams of the recording/reproducing laser light and the servo laser light from the stationary optical system 11 toward the objective lens 107, and for directing the beams of the regenerative light and the servo light, returning from the optical disk 2 via the lens 107, toward the stationary optical system 11.

The optical elements that constitute the optical pickup device 1 are arranged separately in the stationary optical system 11 and the movable optical system 12. The movable optical system 12 includes fewer components and is lighter in weight. Thus, the optical pickup device 1 can move the movable optical system 12 at high speed, so that it can enjoy high-speed access.

The optical disk 2, which includes a reflective layer 21 and at least one recording layer 22, is an optical storage medium capable of the so-called three-dimensional recording. The reflective layer 21 provides a reference for servo control, and independent pieces of information can be recorded in different depths in the optical disk 2. The optical storage medium used may be one that is reported in "Three-Dimensional Memory Using Urethane-Urea Copolymer With Multi-Layer Structure," by Ishikawa et al., from 59th Science Lecture Meeting of Applied Physics Society, 16a-V-5, for example. This report is incorporated herein by reference.

A beam of laser light emitted from the recording/reproducing laser 101 is changed into a parallel beam by the convex lens effect of the collimator 102, transmitted through the prism 111 and then the beam coupling/splitting optical element 106, reflected by the mirror 109, and converged on a given depth position in the recording layer 22 of the optical disk 2 by the objective lens 107. The light beam reflected in the recording layer 22 is reflected by the prism 111 and guided to the regenerative signal detecting optical system 112, tracing a return path.

On the other hand, a beam of laser light emitted from the servo laser 103 is changed into a substantially parallel beam by the convex lens effect of the collimator 104, transmitted through the prism 113, reflected by the beam coupling/splitting optical element 106 and then by the mirror 109, and converged on the reflective layer 21 of the optical disk 2 by the objective lens 107. The light beam reflected by the reflective layer 21 is reflected by the prism 113 and guided to the servo signal detecting optical system 114, tracing a return path.

Preferably, the recording/reproducing laser 101 and the servo laser 103 emit light beams with different wavelengths, and the beam coupling/splitting optical element 106 couples and splits beams by wavelength dependence. For example, a dichroic mirror described in Jpn. Pat. Appln. KOKAI Publication No. 4-291039 is used for the optical element 106. This publication is incorporated herein by reference.

In general, the shorter the wavelength of light beam is, the smaller the spot of the light beam can be. Preferably, therefore, the recording/reproducing laser 101 comprises a laser that emits light with a shorter wavelength than the servo laser 103 does. For example, the lasers 101 and 103 include 680-nm and 780-nm lasers.

Since the two laser lights can be accurately split according to the wavelength with use of the dichroic mirror, the optical pickup device can perform stable recording/reproducing operation without any interference between the lights.

The servo signal detecting optical system 114 detects a focus error signal and a tracking error signal in accordance with the beam of servo laser light returned from the reflective layer 21 of the optical disk 2. A servo control circuit 4 controls the position along the optical axis of the objective lens 107 in accordance with those signals so that the servo laser light beam can be focused on the reflective layer 21.

Based on the beam of recording/reproducing laser light returned from the recording layer 22 of the optical disk 2, moreover, the regenerative signal detecting optical system 112 detects a regenerative signal that corresponds to information recorded in the recording layer 22. A recording/reproduction control circuit 3 reproduces information in accordance with the signal detected by the detecting optical system 112, and transfers the result to a host computer (not shown). Alternatively, the control circuit 3 controls the recording/reproducing laser 101 in accordance with the information from the host computer and records the information in the recording layer 22. The information is recorded in a manner such that the output power of the laser 101 is enhanced to change the physical properties, e.g., refractive index, of the recording layer 22.

The position of the point of convergence of the recording/reproducing laser light beam in the recording layer 22 can be shifted in its layer direction or along the optical axis in the following manner. In the description to follow, it is supposed that the servo laser light beam and the recording/reproducing laser light beam are focused on the reflective layer 21 and the central portion of the recording layer 22, respectively, in an initial state.

Figure 2:
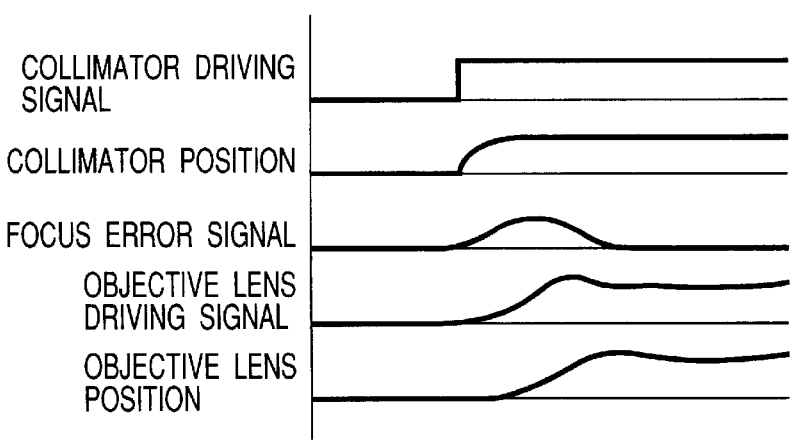
FIG. 2 is a time chart for illustrating change of the layer-direction position of the point of convergence of a recording/reproducing laser in the optical information recording/reproducing apparatus of FIG. 1.

If the actuator 105 is actuated in response to a collimator driving signal shown in FIG. 2 with the servo laser light beam focused on the reflective layer 21, the position of the collimator 104, which serves substantially to collimates the light beam emitted from the servo laser 103, changes in the manner shown in FIG. 2, and the parallelism of the beam from the collimator 104 to the objective lens 107 changes.

Consequently, the state of focusing on the reflective layer 21 changes. The servo signal detecting optical system 114 detects the change as a change of the value of the focus error signal shown in FIG. 2. The servo control circuit 4 actuates the actuator 108 in response to an objective lens driving signal, shown in FIG. 2, for canceling a focus error, whereupon the position of the actuator 108 along the optical axis of the objective lens 107 is shifted in the manner shown in FIG. 2. In consequence, the point of convergence of the servo laser light beam is moved again to the reflective layer 21, so that the value of the focus error signal is restored to zero.

Since the recording/reproducing laser light beam is not changed in parallelism at all, on the other hand, the point of its convergence moves in the recording layer 22 along its optical axis for a distance corresponding to the movement of the objective lens 107 along the optical axis.

Thus, the layer-direction position of the point of convergence of the recording/reproducing laser light beam in the recording layer 22 can be changed by shifting the position of the collimator 104 for the servo laser light.

Since the recording/reproducing laser light beam is not changed in parallelism, its diameter on the objective lens 107 never changes. Accordingly, the coupling efficiency for the objective lens portion, that is, the light utilization, never changes. In consequence, the quantity of light delivered from the lens 107 to the recording layer 22 is stabilized, so that the optical pickup device can perform reliable recording/reproducing operation.

Since the parallelism of the servo laser light beam changes, the coupling efficiency for the objective lens portion changes, so that power fluctuates. In general, however, AGC (auto-gain control) operation is carried out in the servo control circuit 4 to standardize error signals according to their sum signal (total quantity of light), so that the influence of the fluctuation of power upon the detected error signals is absorbed and arouses no special problem.

Second Embodiment

In the first embodiment, the light beam emitted from the recording/reproducing laser 101 is collimated by the collimator 102 and guided directly to the objective lens 107. In general, however, the light quantity distribution of a light beam emitted from of a semiconductor laser is elliptic, so that the light quantity in the direction of the major axis is kicked during use. Thus, the power efficiency is poor.

Figure 3:
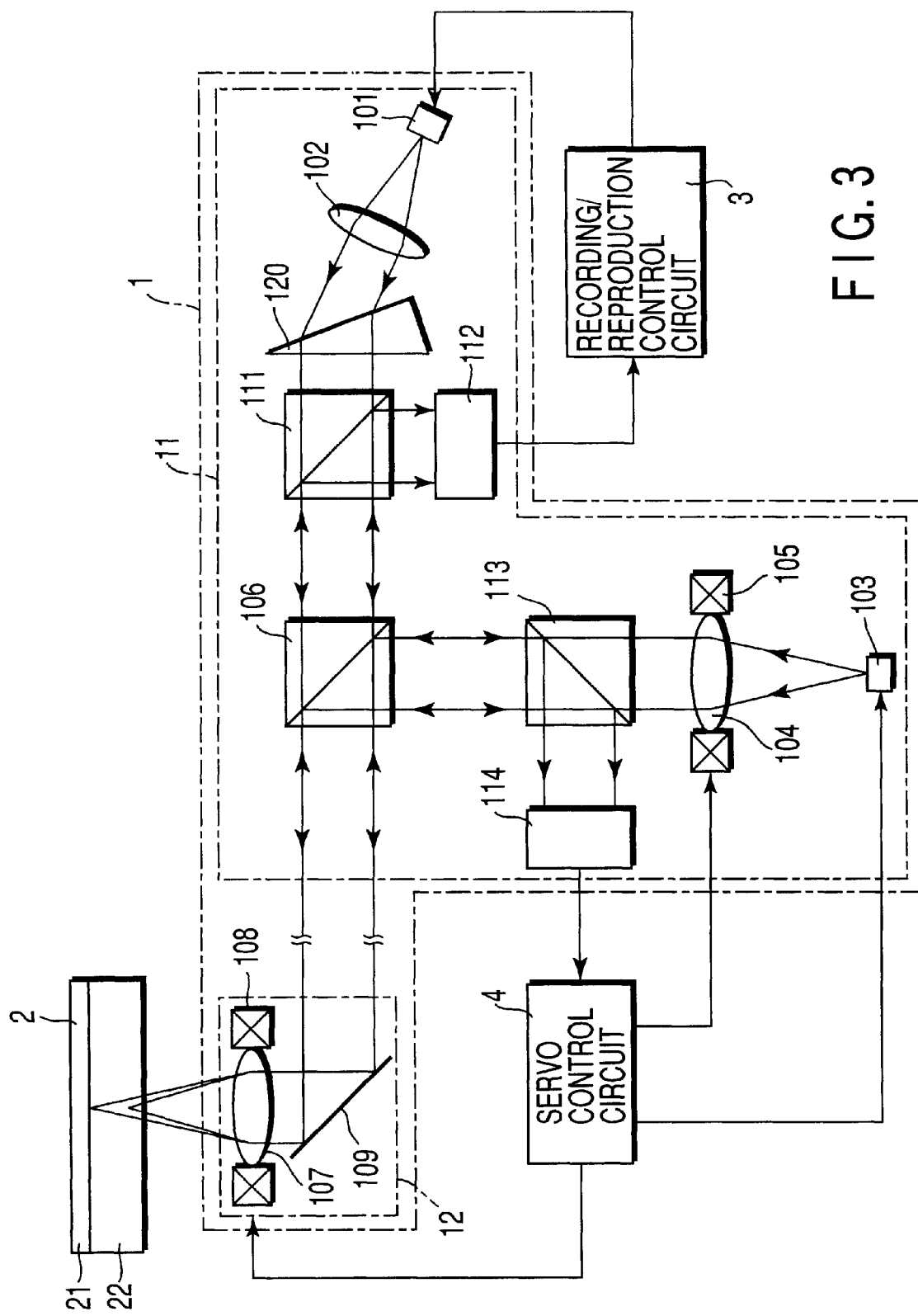
FIG. 3 shows an optical information recording/reproducing apparatus according to a second embodiment of the invention.

An optical information recording/reproducing apparatus according to a second embodiment, compared with the first embodiment, is improved in power efficiency. As shown in FIG. 3, the apparatus further comprises a beam shaping prism 120 located between a collimator 102 and a prism 111. An optical pickup device according to the present embodiment is constructed quite in the same manner as the one according to the first embodiment except for the presence of the prism 120.

The beam shaping prism 120 has entrance and emission surfaces, which are not parallel to each other. Although it has no magnification in the direction perpendicular to a plane of the drawing, it has one in the direction parallel to the plane of the drawing. Thus, the prism 120 has an anamorphic property such that it enlarges a transmitted beam only in one direction (parallel to the drawing plane in FIG. 3), thereby making the light quantity distribution in the cross section of the beam substantially circular. In consequence, the cross section of the beam becomes substantially circular, so that the light quantity cannot be kicked by any optical components including the objective lens 107, and the beam utilization can be improved.

Laser light beams incident upon the beam shaping prism 120 are expected to have high parallelism. A low-parallelism beam inevitably has astigmatism after it passes the prism 120, owing to the anamorphic property of the prism 120. The astigmatism ruins the shape of each spot formed in the recording layer 22, thereby hindering reliable recording/reproducing operation.

According to the present embodiment, the position of the point of convergence of the recording/reproducing laser light beam is shifted by moving the collimator 104 for the servo laser 103 that never serves for the recording/reproducing operation. Since the collimator 102 for the recording/reproducing laser 101 cannot be moved for the movement of the beam on the point of convergence of the recording/reproducing laser light, the parallelism of the recording/reproducing laser light beam incident upon the beam shaping prism 120 can be controlled with high accuracy. Thus, the recording/reproducing laser light beam is subject to no astigmatism.

According to the present embodiment, beam shaping can ensure high utilization for the recording/reproducing light quantity beam without subjecting it to any aberration. Therefore, reliable recording/reproducing operation can be performed with use of a high-speed optical disk drive that requires high power.

Third Embodiment

In the first embodiment, the position of the point of convergence of the recording/reproducing laser light beam is shifted by moving the collimator 104 for substantially collimating the servo laser light beam first and then moving the objective lens 107 to correct defocusing of the servo laser light beam caused by movement of the collimator 104. As this is done, the defocusing attributable to the movement of the collimator 104 is detected, the objective lens 107 is moved correspondingly, and feedback control is carried out such that the point of convergence of the servo laser light beam is returned to the position on the reflective layer 21.

Since the point of convergence of the recording/reproducing laser light beam is moved in the recording layer 22 by the feedback control, time for the movement of the point of convergence of the recording/reproducing laser light beam is substantially equal to the sum of the response time of the collimator 104 and the response time of a focus control system.

Figure 4:
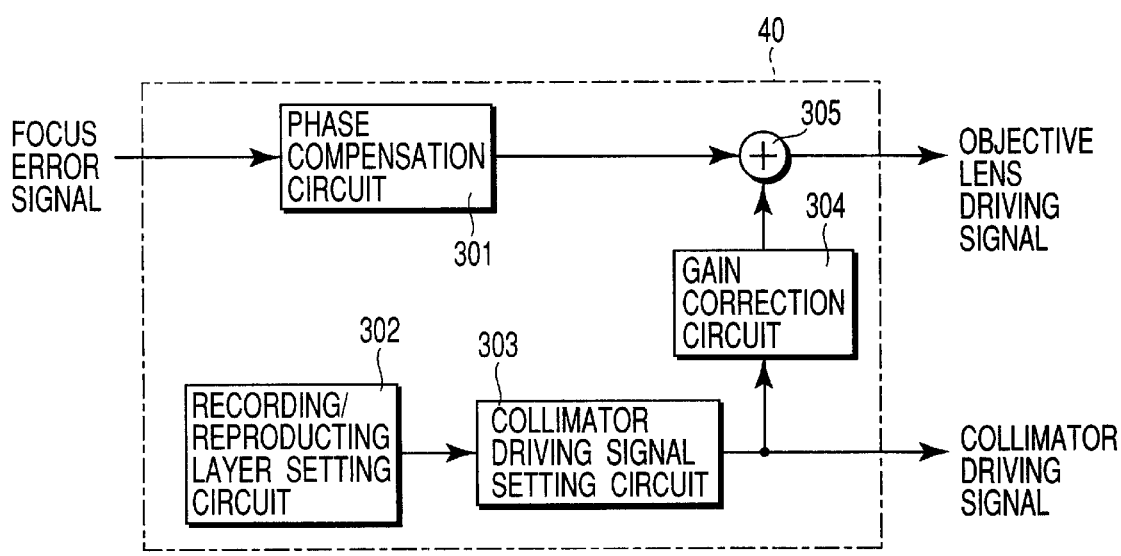
FIG. 4 shows a control device according to a third embodiment used in place of a servo control circuit shown in FIG. 1.

An optical information recording/reproducing apparatus according to a third embodiment compared with the first embodiment, is improved in access time. FIG. 4 shows a control device that is used in place of the servo control circuit shown in FIG. 1.

As shown in FIG. 4, a control device 40 comprises a phase compensation circuit 301, recording/reproducing layer setting circuit 302, collimator driving signal setting circuit 303, gain correction circuit 304, and adder circuit 305. The compensation circuit 301 receives a focus error signal as an input and serves to stabilize a focus control loop. The setting circuit 302 serves to set the position where recording/reproducing laser light is converged. The output of the setting circuit 303 is applied to an actuator 105 for driving a collimator 104, and the output of the adder circuit 305 to an actuator 108 for driving an objective lens 107. A collimator driving signal is added to an objective lens driving signal by the gain correction circuit 304, whereby a path for feedforward control is formed.

The recording/reproducing layer setting circuit 302 serves to determine the layer-direction position or depth position of the recording/reproducing laser light, while the collimator driving signal setting circuit 303 serves to set a driving signal corresponding to the depth position. The actuator 105 is actuated in response to a collimator driving signal shown in FIG. 5, and the position of the collimator 104 changes in the manner shown in FIG. 5.

Figure 5:
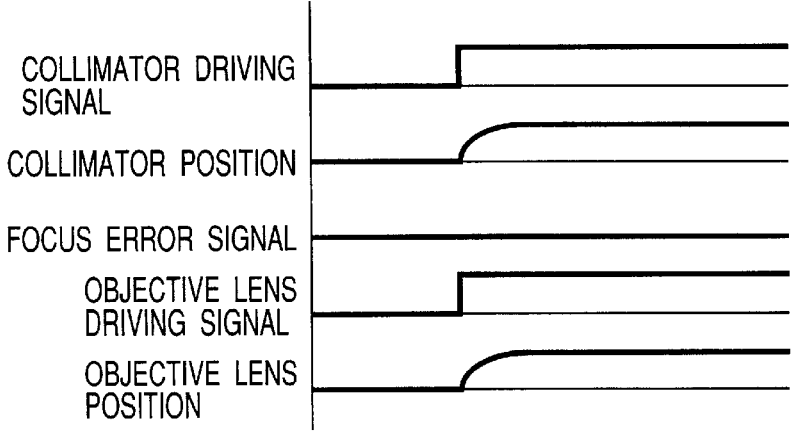
FIG. 5 is a time chart for illustrating change of the layer-direction position of the point of convergence of a recording/reproducing laser controlled by the control device of FIG. 4.

At the same time, the collimator driving signal for actuating the actuator 105 is also applied to the gain correction circuit 304. After gain correction is carried out, the collimator driving signal is added to the output of the phase compensation circuit 301. Thus, the objective lens driving signal shown in FIG. 5 is supplied to the actuator 108, and correspondingly, the position of the objective lens 107 changes in the manner shown in FIG. 5.

The gain correction circuit 304 outputs a signal such that the defocusing of the light beam from the reflective layer 21 attributable to the movement of the collimator 104 is canceled by the movement of the objective lens 107. Thus, the gain of the gain correction circuit 304 is settled depending on the respective magnifications of the collimator 104 and the objective lens 107 and the respective driving sensitivities of the actuators 105 and 108.

In this manner, the objective lens 107 is subjected to the feedforward control as the collimator 104 is moved. As compared with the control based on the feedback control only, therefore, the control is hardly subject to any fluctuation in position of the point of convergence of the servo laser light beam, as seen from the focus error signal shown in FIG. 5. Thus, the time for the movement of the point of convergence of the recording/reproducing laser light cannot be influenced by the response time of a focus control system. Therefore, the movement time is settled depending on the respective response times of the actuator 105 for driving the collimator 104 and the actuator 108 for driving the objective lens 107. In consequence, the optical information recording/reproducing apparatus according to the present embodiment can quickly change the depth of the point of convergence of the recording/reproducing laser light beam, that is, the recording surface.

In any of the embodiments described herein, the recording/reproducing operation is carried out with use of one recording/reproducing light beam. Alternatively, however, it may be performed in a parallel manner by a plurality of recording/reproducing light beams. Further, the beams may be split by polarization, for example, instead of being split by wavelength dependence.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording/reproducing apparatus for recording/reproducing information in/from an optical storage medium having a reflective layer for providing a reference for servo control and a recording layer capable of storing independent pieces of information in different depths, comprising:

a first light source for emitting a first beam of light for servo control;

a second light source for emitting a second beam of light for a recording/reproducing operation;

a first lens for substantially collimating the first beam;

a second lens for collimating the second beam;

first lens driving means for supporting the first lens movably along the optical axis of the first beam;

an objective lens for converging the first and second beams on the reflective layer and in the recording layer of the optical storage medium, respectively;

objective lens driving means for supporting the objective lens movably along the optical axis;

beam coupling/splitting means for directing both the first and second beams coming from different directions toward the objective lens and directing first and second beams reflected from the optical storage medium and then transmitted through the objective lens in the respective directions of incidence of the beams;

first detecting means for detecting an error signal on the basis of the first beam returned from the reflective layer;

second detecting means for detecting a regenerative signal on the basis of the second beam returned from the recording layer; and control means for controlling the objective lens driving means in response to the error signal from the first detecting means so that the first beam is focused on the reflective layer, the control means including a position setting circuit for setting the position of convergence of the second beam in the recording layer, and a driving signal setting circuit for setting a first lens driving signal of the first lens driving means on the basis of the set position of convergence, so that the position of convergence of the second beam is changed along the depth of the recording layer.

2. An optical information recording/reproducing apparatus according to claim 1, which further comprises a prism, disposed between the second lens and the beam coupling/splitting means, for shaping the second beam so that the light quantity distribution in the cross section of the second beam is substantially circular.

3. An optical information recording/reproducing apparatus according to claim 1, wherein the first and second beams have different wavelengths, and the beam coupling/splitting means splits the beams by wavelength dependence.

4. An optical information recording/reproducing apparatus according to claim 3, wherein the wavelength of the second beam is shorter than the wavelength of the first beam.

5. An optical information recording/reproducing apparatus according to claim 1, wherein the optical information recording/reproducing apparatus comprises a separated optical system comprising a movable optical system and a stationary optical system, and the objective lens and the objective lens driving means are included in the movable optical system and other elements in the stationary optical system.

6. An optical information recording/reproducing apparatus for recording/reproducing information in/from an optical storage medium having a reflective layer for providing a reference for servo control and a recording layer storing independent pieces of information in different depths, comprising:

a first light source for emitting a first beam of light for servo control;

a second light source for emitting a second beam of light for a recording/reproducing operation;

a first lens for substantially collimating the first beam;

a second lens for collimating the second beam;

first lens driving means for supporting the first lens movably along the optical axis of the first beam;

an objective lens for converging the first and second beams on the reflective layer and in the recording layer of the optical storage medium, respectively;

objective lens driving means for supporting the objective lens movably along the optical axis;

beam coupling/splitting means for directing both the first and second beams coming from different directions toward the objective lens and directing first and second beams reflected from the optical storage medium and then transmitted through the objective lens in the respective directions of incidence of the beams;

first detecting means for detecting an error signal on the basis of the first beam returned from the reflective layer;

second detecting means for detecting a regenerative signal on the basis of the second beam returned from the recording layer; and control means for controlling the objective lens driving means in response to the error signal from the first detecting means so that the first beam is focused on the reflective layer, the control means including a position setting circuit for setting the position of convergence of the second beam in the recording layer, a driving signal setting circuit for setting a first lens driving signal of the first lens driving means on the basis of the set position of convergence, and adding means for adding the first lens driving signal of the first lens driving means to an objective lens driving signal of the objective lens driving means, and the first lens driving signal is supplied to the objective lens driving means for feed-forward control.

7. An optical information recording/reproducing apparatus according to claim 6, further comprising a prism disposed between the second lens and the beam coupling/splitting means, for shaping the second beam so that the light quantity distribution in the cross-section of the second beam is substantially circular.

8. An optical information recording/reproducing apparatus according to claim 6, wherein the first and second beams have different wavelengths, and the beam coupling/splitting means splits the beams by wavelength dependence.

9. An optical information recording/reproducing apparatus according to clam 8, wherein the wavelength of the second beam is shorter than the wavelength of the first beam.

10. An optical information recording/reproducing apparatus according to claim 6, wherein the optical information recording/reproducing apparatus comprises a separated optical system comprising a movable optical system and a stationary optical system, and the objective lens and the objective lens driving means are included in the movable optical system and other elements are included in the stationary optical system.

* * * * *